United States Patent [19]

Osterbrink

[11] Patent Number: 5,538,219
[45] Date of Patent: Jul. 23, 1996

[54] REDUCED NOISE SOLENOID VALVE

[75] Inventor: Mark D. Osterbrink, Rockford, Ill.

[73] Assignee: Borg-Warner Automotive, Inc., Sterling Heights, Mich.

[21] Appl. No.: 358,185

[22] Filed: Dec. 16, 1994

[51] Int. Cl.$^6$ ............................................. F16K 31/06
[52] U.S. Cl. .......................... 251/129.15; 251/129.05; 335/257
[58] Field of Search .................. 251/129.15, 129.01, 251/129.05; 123/520, 516, 521; 335/249, 257, 261, 279, 277

[56] References Cited

U.S. PATENT DOCUMENTS

| | | | |
|---|---|---|---|
| 3,446,473 | 5/1969 | Barker | 251/129.05 X |
| 3,707,992 | 1/1973 | Ellison et al. | 251/129.15 X |
| 4,901,974 | 2/1990 | Cook et al. | 251/129.15 |
| 5,237,980 | 8/1993 | Gillier | 251/129.15 X |
| 5,326,070 | 7/1994 | Baron | 251/129.15 |

Primary Examiner—Kevin Lee
Attorney, Agent, or Firm—Brooks & Kushman; Greg Dziegielewski

[57] ABSTRACT

Modified pole piece and armature members reduce the noise level for purge valves, particularly at low temperatures. A raised outer ring positioned on the lower end of the pole piece mates with a raised step on the upper end of the armature. Alternatively, a noise disk made from a flexible energy absorbing material, such as fluorosilicone, could be positioned between the pole piece and armature; also the valve member positioned on the lower end of the armature could be made from the same material.

6 Claims, 3 Drawing Sheets

REDUCED NOISE SOLENOID VALVE

TECHNICAL FIELD

The present invention relates to solenoid-type purge valves for vehicles, and more particularly a system for reducing the noise of such valves, particularly at reduced temperatures.

BACKGROUND OF THE INVENTION

Purge valves are in common use today for most vehicle engines. The purge valves are used to control the flow of fuel fumes from a gas tank storage canister to the engine. The charcoal canister receives vapors from the gas tank and the purge valve controls the flow of those vapors in order to reduce emissions. For example, at low engine speeds, a small amount of fumes is allowed to flow to the engine. Correspondingly, at higher engine speeds, a large amount of gas fumes is allowed to flow to the engine where they are combusted with the fuel being supplied to the engine.

Many purge valves are pulse width modulated solenoid valves. In these systems, a solenoid is operated by the electronic computerized control system for the vehicle. The solenoid in turn controls a valve which regulates the gas fume flow into the engine.

The solenoid includes an electric coil which activates a pole piece which in turn operates an armature connected to a valve member. The movement of the armature causes it to contact the pole piece, often creating a slight noise in the purge valve system. In cold temperatures when all of the parts of the purge valve are hard and stiff, the noise of the armature striking the pole piece can be significant.

It is an object of the present invention to provide an improved purge valve for a vehicle. It is another object of the present invention to provide a purge valve which has reduced noise characteristics from known purge valves.

It is a further object of the present invention to provide a purge valve in which the armature contacts the pole piece with less force and thus with less associated noise. It is a still further object of the present invention to provide a purge valve with components made of softer materials which operate to reduce the noise of the purge valve in operation.

It is also another object of the present invention to provide a purge valve which has reduced noise at lower temperatures.

These and other objects, features and benefits of the invention will become apparent from the following description of the invention when viewed in accordance with the accompanying drawings and construed in accordance with the appended claims.

SUMMARY OF THE INVENTION

The reduced noise solenoid valve has a raised annular ring on the pole piece of the solenoid. A matching raised step is positioned on the mating face of the movable armature. The relationship between these structures reduces the force acting on the armature when the solenoid is activated. The lower force acting on the armature produces a lower impact velocity which in turn reduces the noise generated by the valve.

There is a preferred relationship between the height of the annular ring on the pole piece and the inner diameter of the annular ring. That relationship is approximately 2:7.

Additional noise reduction in the purge valve is achieved by constructing the armature seat of a soft material, such as fluorosilicone, and also by providing an annular disk made of a similar material positioned between the pole piece and the armature. The armature seat and noise disk absorb shock from the moving armature and prevent the shock from being transmitted as noise from the valve.

As an alternative, the raised annular ring on the pole piece can be made of an energy absorbing material, such as fluorosilicone. The ring can be formed on the pole piece or made separately and assembled or secured to the pole piece.

BEST MODE(S) FOR CARRYING OUT THE INVENTION

Figure 1:
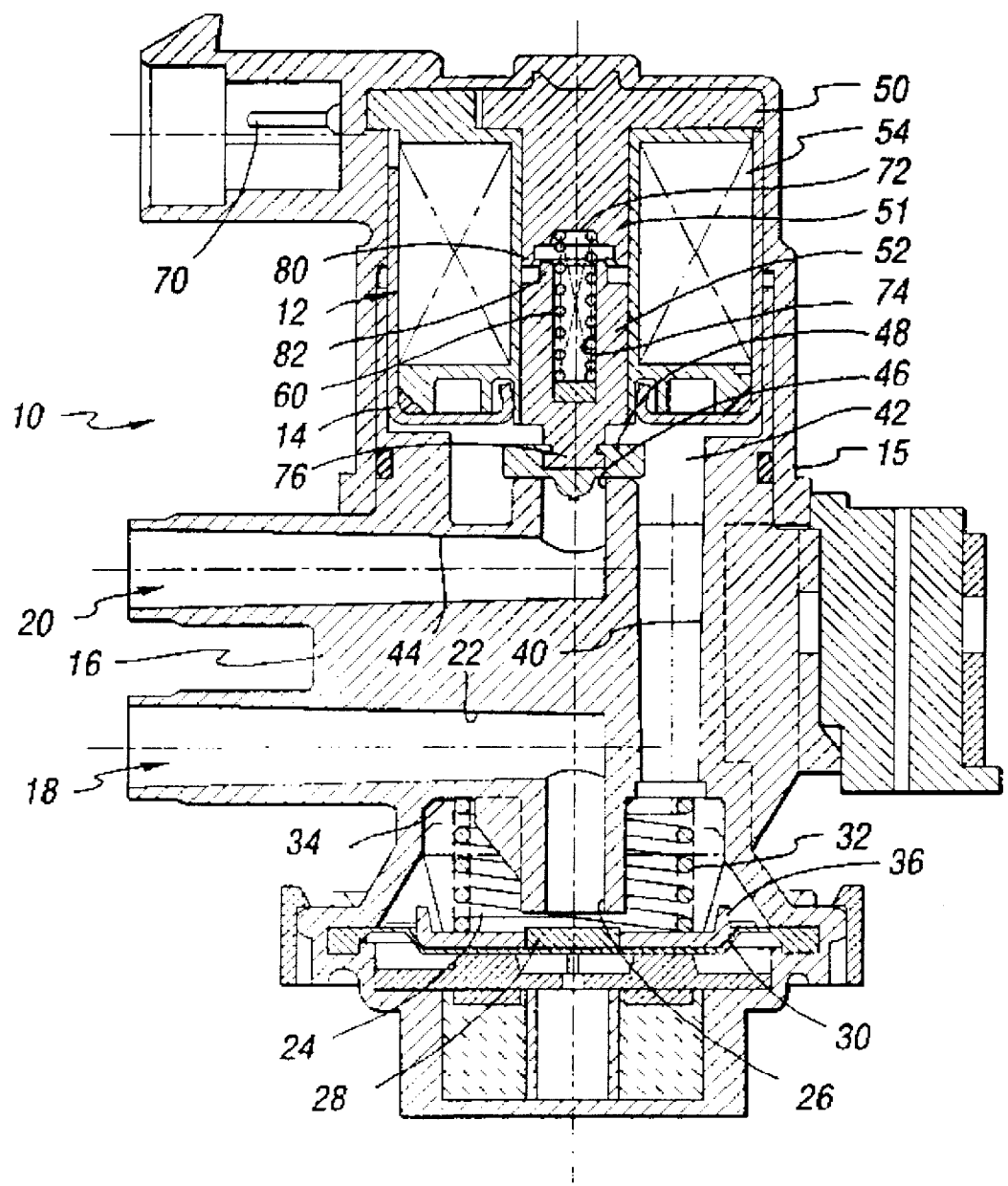
FIG. 1 illustrates a purge valve incorporating the present invention.

A purge valve in accordance with the present invention is identified generally by the number 10 in FIG. 1. The purge valve 10 includes a solenoid device 12 and a valve mechanism 16. The solenoid 12 has a housing 14 and is secured to the valve mechanism 16 by body member 15.

The valve mechanism 16 includes an inlet 18 and outlet 20 for transfer of fuel fumes or other gases or fluids from the gas tank charcoal storage canister (not shown). In this regard, although the present invention is shown in its preferred embodiment, that is as part of a vehicle purge valve, it is understood that the present invention can be used with a solenoid device for numerous purposes.

Inlet 18 communicates with passageway 22 which opens into chamber 24. The outlet port 26 of passage 22 into chamber 24 is a valve seat and is controlled by valve member 28 positioned on diaphragm 30. Coil spring 32 situated between shoulder 34 and movable plate 36, helps to control movement of the diaphragm 30 and in turn the valve member 28.

Chamber 24 in turn is in communication with passageway 40 which opens into chamber 42. Chamber 42 in turn communicates through passageway 44 to outlet 20. The flow of gas or other fluids between chamber 42 and passageway 44 is controlled by valve 46 on which is positioned valve member 48. The opening and closing of valve 46 by the movement of valve member 48 is controlled by the solenoid device 12.

The solenoid device 12 has a pole piece 50, a movable armature 52 and a coil of wires 54. The armature is preferably made of stainless steel with a Teflon coating. Activation of the solenoid 12 and the coil 54 energizes the armature 52 to retract toward the pole piece (upwardly as shown in FIG. 1). This opens the valve 46. Spring member 60 positioned between the stationary pole piece 50 and movable armature 52 keeps the valve 46 closed when the solenoid is not energized.

The operation of the purge valve is controlled by the electronic computerized control system of the vehicle (not shown). The purge valve 10 is connected to the control system by plug or terminal 70.

As known, purge valves are commonly used in the automobile industry to control the flow of fuel fumes from the gas tank charcoal storage canister to the engine. The purge valves, which normally are pulse width modulated solenoid valves, regulate the flow of fuel from the storage canister into the engine where the fumes are combusted along with the fuel conventionally added to the engine during combustion.

The primary purpose of the purge valve is to control the emissions from the engine into the atmosphere. The purge valve is normally controlled by the electronic circuitry of the automobile to allow a smaller flow of fuel fumes into the engine at low engine speeds and correspondingly allow a higher fuel fume flow at higher engine speeds.

In known purge valves, the pole piece of the solenoid typically has a first recessed portion 72 which is used to hold one end of the spring 60. Correspondingly, the armature has a central bore or recess 74 which supports and holds the opposite end of the spring.

Figure 3:
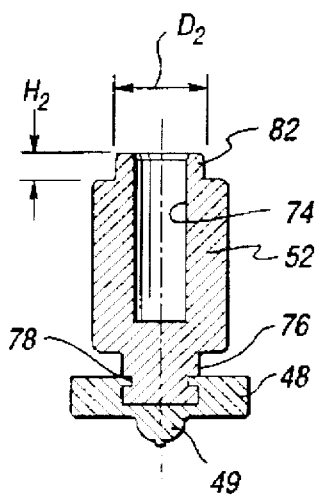
FIG. 3 illustrates an armature for use with the present invention.
Figure 3A:
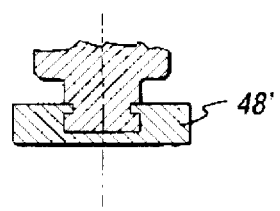
FIG. 3A illustrates an alternate embodiment of a valve member for use with the present invention.

Also, the lower end 76 of armature 52 has valve member 48 connected thereto. Typically, the valve member 48 is made from a molded material (such as nitril or "Vernalon") and is formed to fit on annular recess 78 on the end 76 of the armature 52. In this regard, two different configurations of the valve member 48 are shown (see FIGS. 3 and 3A). In FIG. 3, the valve member 48 has a nub or protrusion 49 which fits within the passageway 44, while valve member 48' in FIG. 3A has a planar lower surface which acts to seal the valve 46.

For purpose of this application, the terms "upper" and "lower" relative to ends or portions of the components of the present invention are utilized for illustrative purposes only. These terms are being used with reference to the Figures in the drawings which have a certain orientation. However, it is understood, that the purge valve could be positioned in the vehicle in various orientations, and such orientations are not to be used to limit the features of the present invention.

Figure 2:
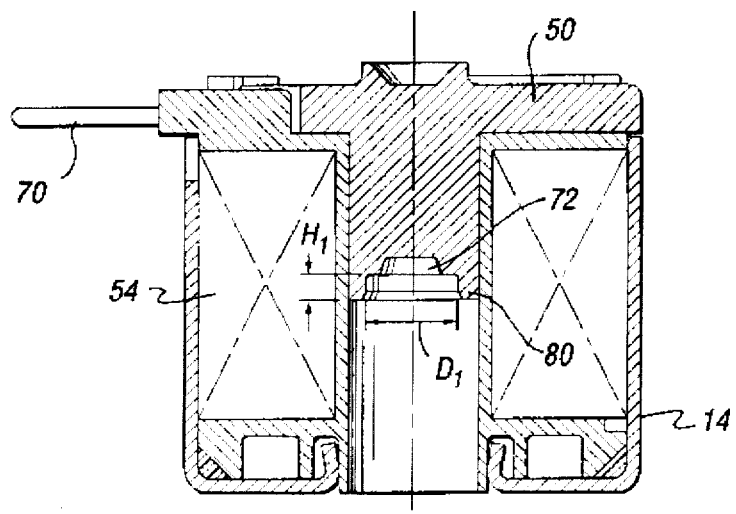
FIG. 2 generally illustrates a solenoid device utilizing the present invention.
Figure 4:
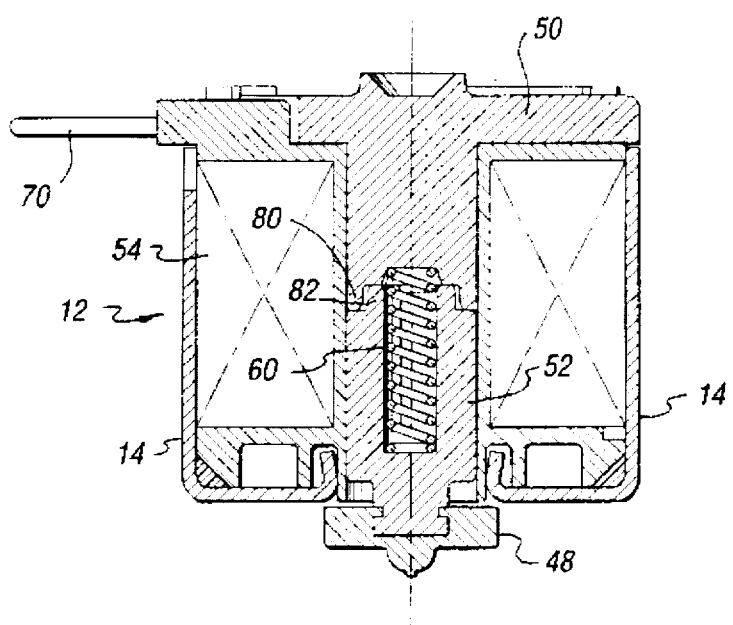
FIG. 4 illustrates a solenoid device in accordance with the present invention.

In accordance with the present invention, the pole piece 50 has a raised annular outer ring or ridge 80 on the lower end surrounding recess 72. This is shown in FIGS. 1, 2 and 4. Correspondingly, the armature 52 has a raised annular step or ring 82 which is adapted to fit within the annular ring 80. The raised step is shown in particular in FIGS. 1, 3 and 4.

The combination of the raised annular ring on the pole piece and the matching step on the armature reduces the force acting on the armature when the solenoid is activated. This results in a lower impact velocity when the armature reaches its limit of travel. In particular, the structure modifies the magnetic field in the solenoid. Since the force field depends on the size and shape of the gap or space between the armature and the pole piece; the structure of the ring 80 and step 82 provide a more constant force regardless of the distance to be travelled by the armature. Thus, less force is needed to operate the solenoid in accordance with the present invention and it uses less energy.

During operation of the invention, armature 52 with step 82 travels at a slower velocity when it makes contact with the pole piece 50. The structure has more of a force at the beginning of travel and less of a force at the end. The armature accelerates faster, but to a lower final velocity. Since the armature is at a lower velocity, it strikes the pole piece with a reduced force producing less noise.

Preferably, the dimensions and relationships between the ring 80 and step 82 have a certain relationship. The height H1 of the ring 80 on the pole piece is preferably 1.75 mm while the inner diameter D1 of the annular ring 80 preferably has a diameter of 6.35 mm (see FIG. 2). Also, the diameter D2 of the raised step 82 on the armature 52 is preferably 5.84 mm while the height H2 of the step 82 is 1.75 mm (see FIG. 3).

The difference between D1 and D2 relative to the heights H1 and H2 preferably is on the order of 2:7. Thus, if the difference between diameters D1 and D2 is larger, then the height H1, H2 will have to be greater. Similarly, if the difference between the diameters D1 and D2 is smaller (i.e. a smaller gap exists between the outer diameter of the step 82 and the inner diameter of the ring 80), then the height H1, H2 will have to be smaller.

Figure 2A:
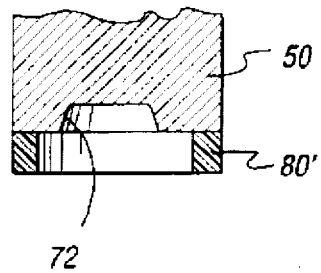
FIG. 2A is an alternate embodiment of a pole piece for use with the present invention.

In order to further reduce the noise level of the purge valve, the outer ring 80 on the pole piece could be made from a softer energy absorbent material, such as fluorosilicone. As shown in FIG. 2A, the annular ring 80' of absorbent material could be secured to the lower end of the pole piece 50.

Figure 5:
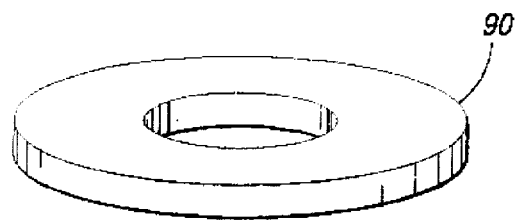
FIGS. 5 and 5A illustrate alternate embodiments of noise disks which can be used in accordance with the present invention.
Figure 5A:
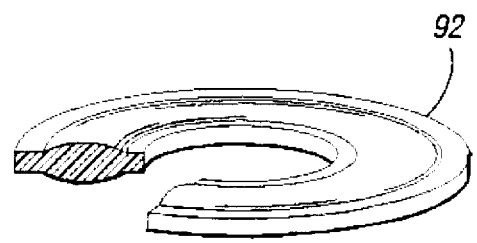

Alternately, it is possible to provide a noise reduction disk positioned between the pole piece and armature and made of a flexible, energy absorbent material. Noise disks 90 and 92 which could be used in this regard are shown in FIGS. 5 and 5A, respectively. Noise disk 90 is an annular ring of absorbent material, such as fluorosilicone, and which has a square or rectangular cross section. Noise disk 92 as shown in FIG. 5A, also is an annular ring made from an absorbent material such as fluorosilicone, but preferably has a cross sectional size and shape as shown in the drawing. Currently noise disks used in purge valves are made from nitril or Vernalon.

To further increase the noise reducing aspects of the purge valve, the valve member 48, 48' could also be provided of an energy absorbing material, such as fluorosilicone. With this embodiment of the invention, both ends of the movable armature 52 are provided with energy absorbing materials which remain flexible within normal temperature ranges and absorb the forces associated with movement and striking of the armature against the valve 46 or pole piece 50.

FIG. 4 illustrates the solenoid device 12 with the armature 52 positioned in the coil 54 and in contact with the lower end of the pole piece 50. When the solenoid 12 is energized and the armature 52 is moved into the position shown in FIG. 4, the valve 46 is opened allowing passage of fuel fumes into the engine.

Figure 6:
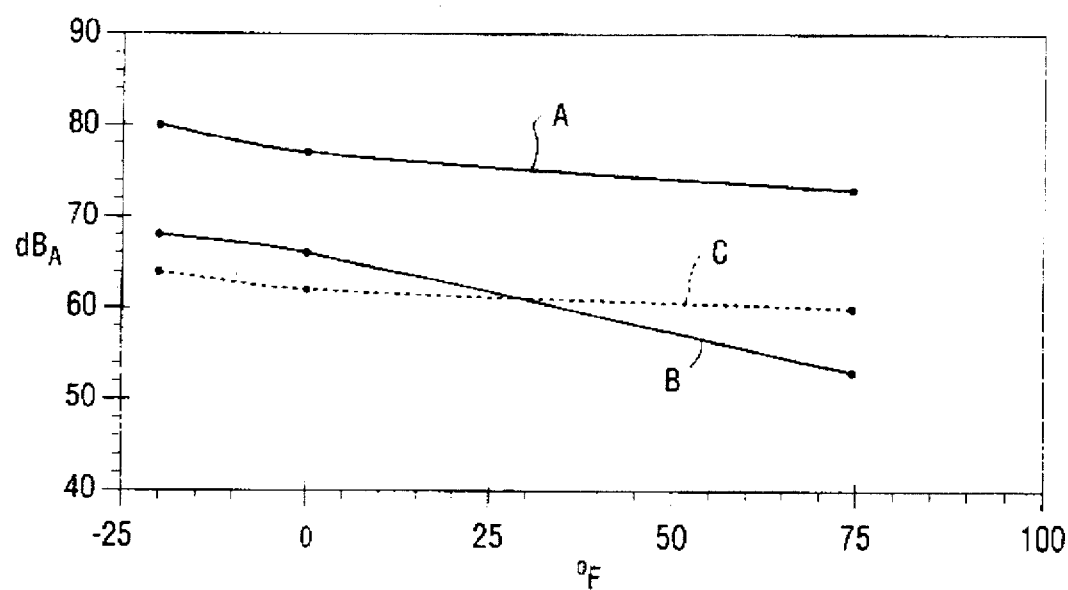
FIG. 6 is a graph depicting the results of tests comparing standard purge valves with embodiments of the present invention.

Tests were conducted demonstrating the benefits of embodiments of the present invention. The results show that the present invention secures noise reduction on the order of 10–20% over known purge valves. The tests compared a standard purge valve (Valve A) with modified purge valves which incorporated features of the present invention (Valves B and C). The standard purge valve had a nitril noise disk and valve member. Valves B and C had noise disks made of fluorosilicone material of the approximate size and configuration shown in FIG. 5 (identified by the numeral 90)

positioned between the pole piece and the armature. (The armature and pole piece did not have annular ridges or rings on them.) In addition, a valve member of the type shown in FIG. 3A identified by the numeral 48' and made of fluorosilicone was provided on the lower end of the armature. Tests were then conducted with (Valves B and C) and without (Valve A) the presence of the fluorosilicone noise disk and fluorosilicone valve member. The results are set forth below and shown in FIG. 6:

| TEMP (°F.) | VALVE A (Standard) (dBA) | VALVE B (modified) (dBA) | VALVE C (modified) (dBA) |
| --- | --- | --- | --- |
| −20 | 80 | 68 | 64 |
| 0 | 77 | 66 | 62 |
| +75 | 73 | 53 | 60 |

As shown, the three valves were tested at a range of temperatures. Specifically, the valves were tested at −20° F., 0° F. and 75° F. The decrease in decibel level (dBA) was significant for both of the modified valves compared with the standard valve. In particular, at low temperatures as on the order of −20° F., the two modified valves reduced the noise level approximately 15–20%. Similar noise reductions at 0° F. and at 75° F. were also achieved.

Providing the valve seat and noise disk from a softer energy absorbing material, such as fluorosilicone, provides significant noise reduction. The two components absorb the shock from the moving steel armature and prevent the shock from being transmitted as noise from the purge valve. Similarly, providing a raised ring or ridge on the lower end of the pole piece and a mating raised step or ridge on the upper end of the armature reduces the force acting on the armature. The lower force acting on the armature in turn produces a lower impact velocity of the armature against the pole piece which also reduces the noise generated by the purge valve.

Either of the alternate configurations and structures for reducing the noise of the purge valve, particularly in cold weather, could be utilized, either by themselves, or in combination with each other. Either of the alternatives used separately produces a substantial noise reduction that is significant.

Although particular embodiments of the present invention have been illustrated in the accompanying drawings and described in the foregoing detailed description, it is to be understood that the present invention is not to be limited to just the embodiments disclosed, but that they are capable of numerous rearrangements, modifications and substitutions without departing from the scope of the claims hereafter.

What is claimed is:

1. A valve device for a vehicle, said valve device comprising:

a housing, valve means in said housing for controlling the flow of fluids through said valve device, said valve means having a valve seat and a movable valve member;

a solenoid device in said housing, said solenoid device having a pole piece member, a movable armature member and a spring member;

said armature member having a first end and a second end;

said valve member comprising a flexible energy absorbing material and attached to said first end of said armature member;

said pole piece member having a raised outer annular ring positioned toward said armature member with a central recess;

said second end of said armature member having a centrally-located raised circular ridge member for mating with said recess in said pole piece member upon activation of said solenoid device; and said raised outer annular ring having an inner diameter dimension and a height dimension, said raised circular ridge member has an outer diameter dimension, and the relationship between the difference between said outer diameter dimension and said inner diameter dimension relative to said height dimension is about 2:7;

wherein operation of said valve device is accomplished with reduced noise.

2. The valve device as set forth in claim 1 wherein said energy absorbing material for said valve member is fluorosilicone.

3. The valve device as set forth in claim 2 wherein said raised outer annular ring on said pole piece member is made from an energy absorbing material.

4. The valve device as set forth in claim 3 wherein said energy absorbing material is fluorosilicone.

5. The valve device as set forth in claim 1 wherein said raised outer annular ring comprises a flexible annular disk member.

6. The valve device as set forth in claim 1 wherein said valve device is a purge valve device.

* * * * *